Nov. 11, 1969     D. DINERMAN     3,477,269
VEHICLE REPAIR DEVICE
Filed Dec. 7, 1967
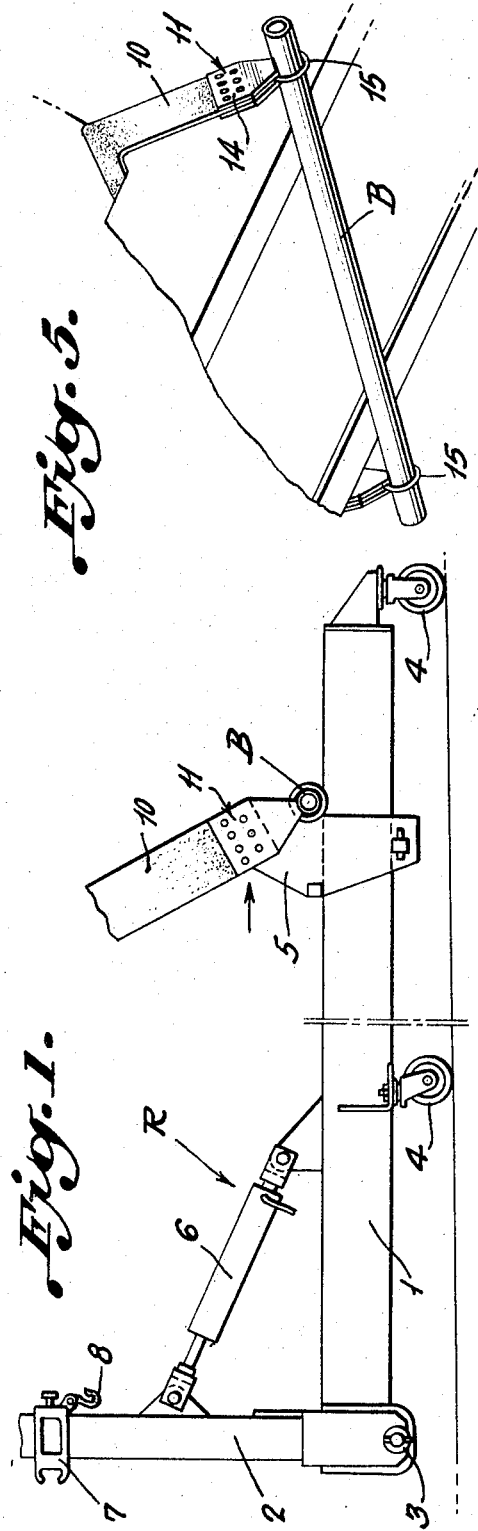
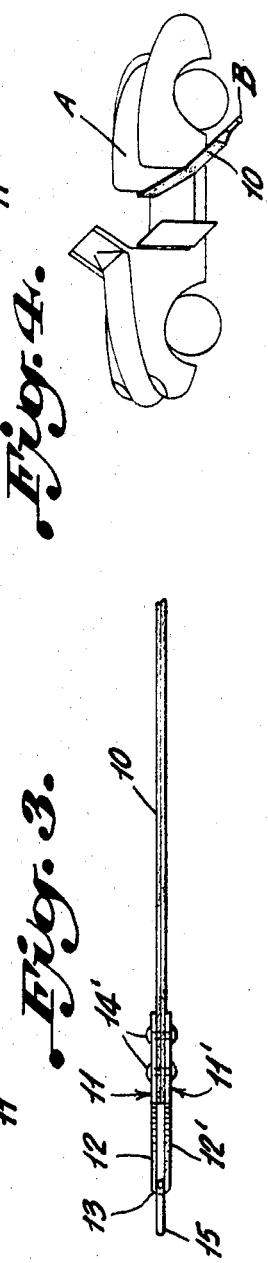
INVENTOR
DAVID DINERMAN
BY
ATTORNEY United States Patent Office 3,477,269
Patented Nov. 11, 1969

3,477,269
VEHICLE REPAIR DEVICE
David Dinerman, 304 Brandywine Road,
Savannah, Ga. 31405
Filed Dec. 7, 1967, Ser. No. 688,860
Int. Cl. B21d 31/00
U.S. Cl. 72—292                              5 Claims

ABSTRACT OF THE DISCLOSURE

This invention concerned with an auxiliary device for use in conjunction with automobile body and frame straightening machines. This device is capable of ready attachment, detachment and adjustment on different components of the automobile body or frame being operated upon which cooperate with the machine, so that the desired straightening forces are brought to bear on the body portions which require correction. In particular, the device consists of a wide flexible belt or band of strong inelastic material fitted with end links which may engage temporarily parts of an automobile body or frame, or the ends of a rod or bar connected with the force-generating straightening machine, to which is transmitted a thrust transverse to the axis of the latter. The belt constitutes an effective holding device for the portion of the automobile body or frame encompassed between the ends of the band and the automobile frame or bar connected thereto, to make possible the rapid application of straightening forces to the desired parts of the frame or body.

Background of the invention

The present invention seeks to cope with the prevalent complaint of the spiralling costs of automobile body repairs. The continuous increase of the costs of labor in all fields, renders desirable a simplification of the preparatory steps which are required before straightening forces on automobile bodies and frames are applied. Some of these steps are time-consuming, as exemplified by the expedients which are disclosed in the patent to Junkins, No. 3,131,747, May 5, 1964, necessitating the application of one or more clamps to the frame of the vehicle. Each clamp is provided with eight screws which require first the attachment to and then the detachment from the vehicle frame.

The instant invention seeks to eliminate the need for such time-consuming operations and makes possible the ready attachment, detachament, and/or adjustment of a special force-transmitting member which is capable of easy manpulation and positioning to make possible the quick application of the straightening forces to the portion of the automobile body or frame requiring such.

Summary of the invention

The invention contemplates the provision of an auxiliary device for use in conjunction with automobile body and frame straightening machines of all types, of which that shown in the patent to Junkins, No. 3,131,748, May 5, 1964, is illustrative.

The device consists of a band or belt of high strength inelastic material, free of any scratch or dent-producing components on the exterior thereof, with closed links on the opposite ends thereof which may be readily attached, removed and adjusted on different components of the automobile body. This band or strap may be positioned relative to the body and vehicle repair machine so that desired forces may be brought to bear upon the portions of the vehicle body or frame which require straightening.

The end links of the strap may be connected to other portions of the vehicle frame, or these may cooperate with a variably positioned bar cooperating with the several relatively movable arms of the straightening machine, for the purpose of transmitting the hydraulic thrust exerted by the machine to the bar, which in turn transmits the force to the portions of the automobile body which require the application of pulling or pushing forces, while part of the body is effectively embraced, without marring or denting, between the ends of the belt.

Objects and description of the invention

It is the object of the present invention to provide a low-cost, rugged and reliable adjunct to vehicle repair machines, which may be readily positioned to exert desired straightening forces on an automobile body or frame with minimum expenditure of time.

It is another object of the invention to provide a reenforced flexible belt of high tensile strength free of any scratch or dent producing components, each of the ends of which are suitably reenforced with a folded metallic plate, the free ends of which are riveted to the ends of the flexible belt, while the folded end is reduced in width for the purpose of receiving a closed link at the end thereof for engagement with a bar or rod which is moved by the force of the hydraulic cylinder of the machine. The end links are easily engaged and disengaged from the movable bar strut, the positioning of which may be easily adjusted without need for any clamps or analogous devices, so that the forces exerted on this strut are transmitted to the body or frame for the purpose of straightening portions of the latter, while part of the body or frame is held tightly between the ends of the flexible belt. The device is particularly advantageous in the case of smaller automobiles having "unitized" frames which render difficult or even impossible the application of clamps thereto.

Other objects and purposes will appear from the detailed description of the invention following hereinafter, taken in conjunction with the accompanying drawings, wherein:

FIG. 1 is a front elevation of a portion of a vehicle repair machine having one end of the flexible band in accordance with the invention detachably anchored to a thrust transmitting member positioned on the machine;

FIG. 2 is a plan view of the flexible belt in accordance with the invention;

FIG. 3 is a front elevation of the left end of the band shown in FIG. 2;

FIG. 4 is a perspective view of the band illustrating one mode of application thereof on a vehicle on which straightening forces are to be exerted by the arrangement shown in FIG. 1; and FIG. 5 is a perspective view of the bottom of the vehicle shown in FIG. 4 with the parts illustrated on a larger scale.

In FIG. 1 of the drawing is shown a conventional vehicle repair device of the type illustrated in the above-mentioned Patent No. 3,131,748, in which a horizontal main beam 1 is pivotally connected to a force applying pressure arm 2 at the pivotal joint 3. The hydraulic cylinder 6 is pivotally joined between members 1 and 2 in order to exert adequate forces when the piston in the cylinder 6 is forced outwardly which serves to rock the vertical arm 2 in a counterclockwise direction and which serves to set up an opposing force in reaction member 5, which is adjustably mounted along the main beam 1. This is indicated by the arrows shown in FIG. 1. Ground engaging wheels 4 are mounted on the main beam 1 to render the machine readily mobile for easy movement relative to an automobile body which requires straightening. The machine may be provided with one or more adjustable straps 7 and hooks 8 which may be clamped to arms 2 at different heights, for the purpose of connecting different parts of the automobile body to the main relatively movable members 2 and 5 to transmit the desired stresses therebetween.

A preferred embodiment of the flexible belt in accordance with the invention is shown in FIGS. 2 and 3. It is formed of strong inelastic sheet material of fabric, synthetic rubber or plastic such as neoprene, reenforced fiberglass fabric, or the like, which is suitably reenforced on the interior thereof but which is free of any scratch or dent-producing components on the exterior thereof. The ends of the belt are additionally reenforced by folded metallic plates 11, 11', which may be of sheet steel of as much as 3/16" in thickness, having enlarged portions 14 coincident with the width of the belt and which may be fastened thereto by a plurality of fasteners 14'. The folded plates taper from enlarged portions 11, 11' through portions 12 and 12' to the fold 13 whereat the closed link 15 is threaded therethrough.

The dimensions of the belt may vary and several belts of different sizes may be provided for the purpose of adapting the device to jobs of different characters and sizes. For example, the belt may have an overall length of 10', with a width of one foot and thickness of 3/8". The metallic portions 11 may overlap the ends of the belt for approximately 8" and the number of fastening bolts or rivets 14' are adequate to withstand the stress loadings which are imposed upon the ends thereof. Of course, the thickness of the metal plates at the ends of the belt may be varied, and the end links may be formed of 1" stock and shaped to a diameter of 3" in order to readily fit over a cylindrical bar having an external diameter slightly less than this dimension.

While the end links 15 have been illustrated as being of substantially circular outline, these closed links may be of any other configuration, for example, these may be square or rectangular for cooperation with a bar B of rectangular section.

The special characteristic of the belt is its ability to withstand great forces which are imposed on the automobile body to effect the straightening of portions thereof, while capable of being flexed both longitudinally and transversely in the course of its action without danger of marring or mutilating other parts of the automobile body or frame. This constitutes a tremendous improvement over chains which have been used extensively heretofore.

The instant invention simplifies the straightening of many parts of a distorted vehicle body or frame, and particularly those built of "unitized" frames, which are lacking in longitudinal beams to which may be applied clamps of the type disclosed in the above-mentioned Patent No. 3,131,747. A thrust transmitting bar B may be loosely disposed in the crotch formed between the main beam 1 and the upright reaction member 5, as shown in FIG. 1. The ends of the flexible belt are adapted to be detachably anchored onto the ends of the bar B after the belt is passed across the vehicle body A with the doors open, as indicated in FIGS. 4 and 5, to confine the rear portion of the vehicle between the ends. When the hydraulic cylinder 6 is actuated, the rearward thrust applied to the bar B relative to the front of the vehicle, which is anchored to hook 8, serves to bend the vehicle frame to the desired extent to effect a straightening of the hood, fenders or other parts on the front of the body, while the rear portion is held tightly by the belt.

Following a desired degree of movement of the distorted body frame, the flexible belt 10 may be readily detached from the bar B and re-engaged therewith following a re-positioning of the bar. Thereby many corrective steps may be executed with a minimum loss of time.

While I have described my invention as embodied in a specific form and as operating in a specific manner for purposes of illustration, it should be understood that I do not limit my invention thereto, since various modifications will suggest themselves to those skilled in the art, without departing from the spirit of my invention, the scope of which is set forth in the annexed claims.

I claim:

1. In combination with an automobile body repair device including a force applying member connected to a reaction member, an inelastic flexible belt of high tensile strength material free of any scratch or dent-producing components on the exterior thereof, and closed links on the ends of said belt for ready attachment, detachment and adjustment on an element controlled by said reaction member for embracing a portion of the vehicle between said links and element, whereby straightening forces are applied rapidly to desired portions of said automobile body.

2. In combination with a vehicle repair device including a force applying member connected to a reaction member, a bar extending transversely to the direction of the thrust adapted to be exerted between said members, and an inelastic flexible band detachably connected to the opposite ends of the bar adapted to embrace a portion of the vehicle between the band and the bar, said band being formed of a material of high tensile strength free of any scratch or dent-producing components on the exterior thereof.

3. A device as set forth in claim 2 wherein said band is fitted with closed links on the opposite ends thereof for loosely engaging the opposite ends of said bar.

4. A device as set forth in claim 3 wherein said bar is of cylindrical cross-section and said closed links are substantially circular.

5. A device as set forth in claim 3 wherein said band is of substantial width, a folded steel plate having the free ends thereof encompassing each end of said band, fastening means joining the steel plates and band together, said steel plate converging from the end of said band to a narrow width whereat said links are engaged at the fold of said plate.

References Cited

UNITED STATES PATENTS

| 1,746,504 | 2/1930 | Turley | 72—292 |
| 2,342,397 | 2/1944 | Harley | 72—292 |
| 2,835,154 | 5/1958 | Geller | 72—705 |

CHARLES W. LANHAM, Primary Examiner

L. A. LARSON, Assistant Examiner

U.S. Cl. X.R.

72—465, 705; 254—133